July 18, 1950 — C. A. BRAUCHLER — 2,515,589
FORGING DIES AND MANUFACTURE THEREOF
Filed March 6, 1947 — 2 Sheets-Sheet 1

Inventor
Charles A. Brauchler
By Frease and Bishop
Attorneys

July 18, 1950  C. A. BRAUCHLER  2,515,589
FORGING DIES AND MANUFACTURE THEREOF
Filed March 6, 1947  2 Sheets-Sheet 2
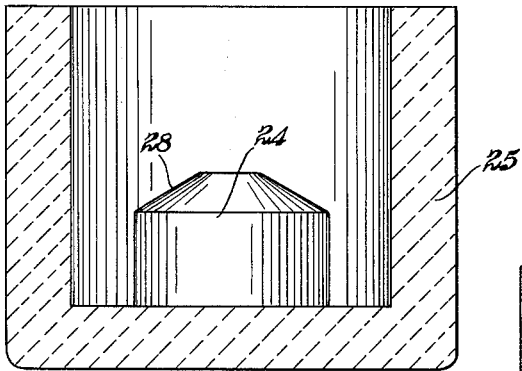
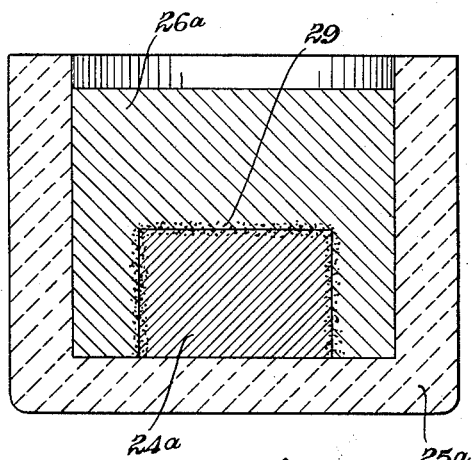
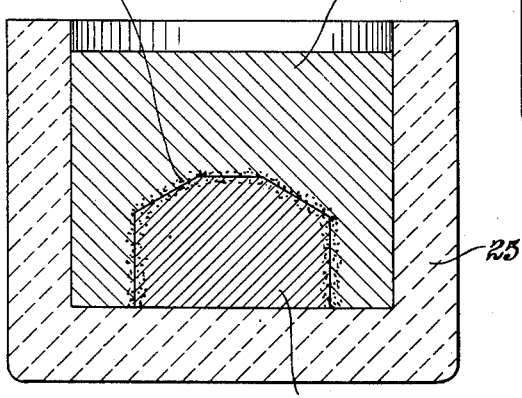
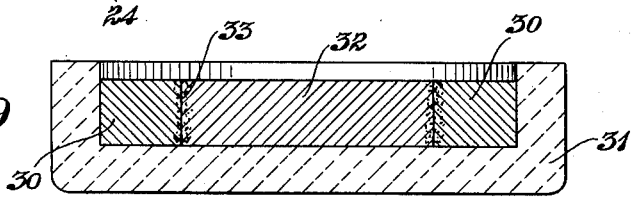
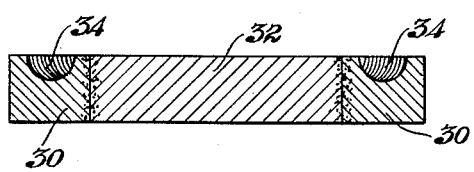
Inventor
*Charles A. Brauchler*
By
*Frease and Bishop*
Attorneys Patented July 18, 1950

2,515,589

UNITED STATES PATENT OFFICE 2,515,589

FORGING DIES AND MANUFACTURE THEREOF

Charles A. Brauchler, Canton, Ohio

Application March 6, 1947, Serial No. 732,791

7 Claims. (Cl. 76—107)

The invention relates to dies and a novel method of making, and more particularly to dies formed of high speed steel and the like for use in the forging of metal articles in hammers, pressers and the like.

Some of these die materials, such as a high speed steel containing tungsten, chromium and vanadium and known as 18—4—1, are not available in large enough pieces to make a complete die thereof, and for this reason it is conventional practice to make such dies by shrinking an outer thickness of some other material around an insert of the high speed steel and forming the die cavities in such high speed steel insert.

This method of forming such dies is not entirely satisfactory as it does not permit of sufficient accuracy and there is also the danger of the insert becoming loosened due to the use of the dies in a forging hammer or press, since there is no bond between the high speed steel insert and the other material surrounding the same.

It is an object of the present invention to provide a die which overcomes the objections and difficulties encountered with the use of conventional dies having shrunk inserts therein.

Another object is to provide a method for making such dies.

A further object is to provide dies comprising a high speed steel insert or core to which is bonded or fused an austenitic steel.

A still further object is to provide a method of making such dies by placing the high speed steel insert in a mold and casting the austenitic steel in the mold, bonding or fusing it with the surface portions of the high speed steel insert.

Another object is to provide for making such dies by placing a round insert of high speed steel in a mold and casting the austenitic steel around the same and then with the die at proper temperature, pressing or otherwise forming it into substantially rectangular cross sectional shape.

Figure 1:
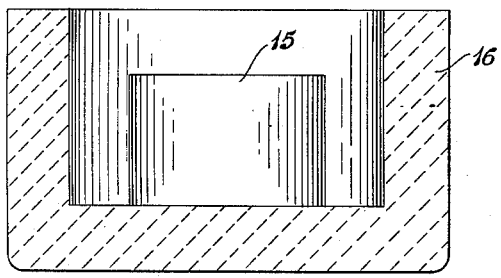
Figure 2:
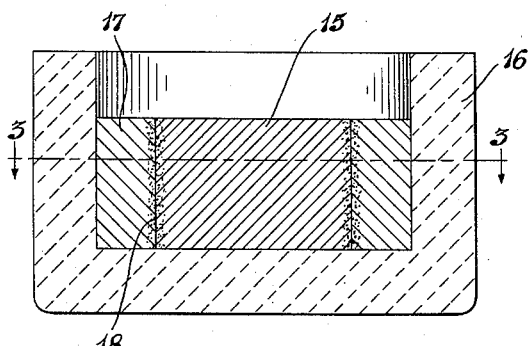
Figure 3:
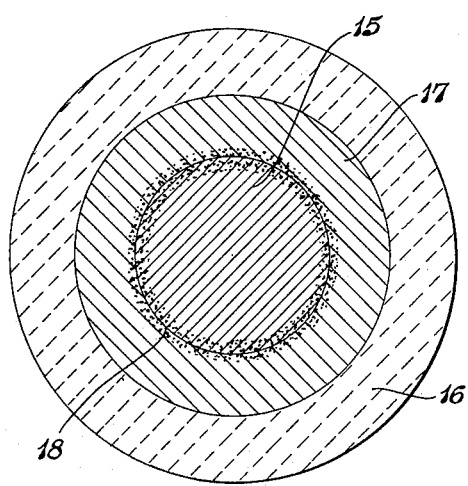
Figure 4:
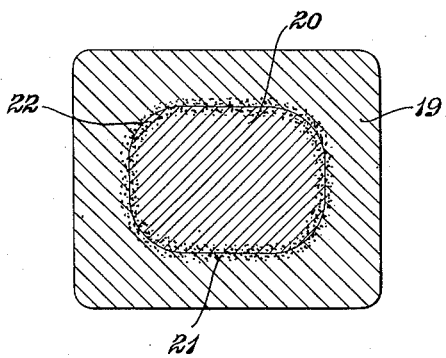
Figure 5:
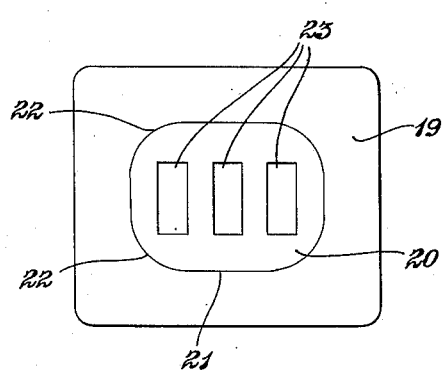

The above objects together with others which will be apparent from the drawings and following description, or which may be later referred to, may be attained by constructing and manufacturing the dies in the manner hereinafter described in detail and illustrated in the accompanying drawings, in which:

Figure 1 is a vertical sectional view of a mold with a high speed steel insert placed therein preparatory to casting austenitic steel around the same;

Fig. 2 a similar view after the austentic steel has been cast around the high speed steel insert;

Fig. 3 a horizontal section through the mold and die taken as on the line 3—3, Fig. 2;

Fig. 4 a horizontal sectional view through the die after it has been formed into substantially rectangular shape;

Fig. 5 a top plan view of the finished die;

Fig. 6 a vertical sectional view through a mold with a high speed steel insert positioned therein preparatory to casting a die in which the insert does not extend entirely through the die block;

Fig. 7 a vertical sectional view through the mold shown in Fig. 6 after the casting operation has been completed;

Fig. 8 a view similar to Fig. 7 showing a slightly different shape of high speed steel insert;

Fig. 9 a vertical sectional view through a mold having an annulus of high speed steel located therein preparatory to casting a die for forging circular articles; and Fig. 10 a transverse sectional view through the finished die formed as shown in Fig. 9.

In carrying out the invention to form a die a substantially cylindrical block 15 of high speed steel, which may be a tungsten, chromium, vanadium steel such as is known in the trade as 18—4—1, is centrally located in a refractory mold 16. An austenitic steel, such as stainless steel or the like, is then cast in the mold around the central block of high speed steel, as indicated at 17 in Figs. 2 and 3.

This casting may be accomplished by what is known as the pluri-metal process in which the austenitic steel is poured into the mold in powdered form and melted by electrodes the heating effect of the electric current passing through the powdered steel between the electrodes causing a fusing of the powdered steel and the adjacent surface portions of the high speed steel block so that the two metals are fused and bonded together as indicated at 18 in Figs. 2 and 3.

In this operation a portion of the fused high speed steel is carried into and mixed with the molten austenitic steel. This results in the two metals being firmly bonded together so that the high speed steel insert will not become loosened in use by the action of the forging hammer or press in which the dies are used.

Since these high speed steels usually come in cylindrical form the die block is cast in circular form as shown in Fig. 3. In cases where it is desirable to provide a substantially rectangular die block the die block shown in Figs. 2 and 3 may be heated to suitable temperature and hammered or pressed into substantially rectangular form as shown in Fig. 4, the outer layer of austenitic steel being shaped to substantially rectangular form as indicated at 19 in said figure while the high speed steel insert, which is considerably harder than the austenitic steel, assumes the general shape indicated at 20 in Fig. 4 with slightly flattened sides 21 and rounded corners 22. As shown in Fig. 5 one or more die cavities as indicated at 23 may then be formed in the high speed steel insert 20.

In some cases it may be desirable to provide a die block in which the high speed steel insert does not extend entirely through the die block.

For this purpose, as shown in Fig. 6, the high speed steel block 24 is centrally placed within the bottom of the refractory mold 25 and the austenitic steel 26 is then cast around the sides and over the top of the high speed steel insert as indicated at 27 in Fig. 7.

In order to produce a better bond the upper edges of the high speed steel insert may be bevelled as indicated at 28 although this form of the invention may be carried out as shown in Fig. 8 without beveling the edges of the high speed steel block 24a, the austenitic steel 26a being cast around the sides and over the top of the same within the refractory mold 25a, causing a fusion and bonding of the two metals as indicated at 29 in said figure.

Where it is desired to form a die for forging annular articles, a ring or annulus 30 of high speed steel may be placed within the refractory mold 31 as shown in Fig. 9 and the austenitic metal may then be cast within the open center of the ring 30 as indicated at 32 in said figure, the two metals fusing and bonding together as indicated at 33. An annular die cavity 34 may then be formed in the high speed steel ring 30 as indicated in Fig. 10.

Although it is preferred that the invention be carried out by the pluri-metal process above described, it may also be accomplished by heating the high speed steel insert nearly to the fusing temperature thereof and immediately positioning it in the refractory mold as above described and pouring molten austenitic steel into the mold causing the two metals to fuse and bond together in the manner above described.

With dies formed in this manner it is necessary to make only the working portion of the die block, in which the die cavities are located, of high speed steel using the less expensive austenitic steel to complete the die block.

It will also be seen that as the two metals are fused and bonded together by forming the die block in the manner above described, there will be no danger of the high speed steel insert becoming loosened from the action of a forging hammer or press in which the dies may be used.

I claim:

1. The method of forming a die block which consists in locating a high speed steel cylinder within a circular mold and pouring powdered austenitic steel into the mold forming an annulus in contact with the peripheral portion of the high speed steel cylinder and then melting the austenitic steel by the heating effect of an electric current passing therethrough between electrodes whereby the peripheral portion of the high speed steel cylinder is fused and bonded to the austenitic steel ring, then at forging temperature forging the composite die blank to substantially rectangular shape, and forming a die cavity in the high speed steel portion thereof.

2. The method of forming a forging die block which consists in locating a high speed steel portion within a mold, and pouring powdered austenitic steel into the mold in contact with certain surfaces of the high speed steel portion, and then melting the austenitic steel by the heating effect of an electric current passing therethrough between electrodes, whereby said certain surfaces of the high speed steel portion are fused and bonded to the austenitic steel, and then forming a die cavity in the high speed steel portion.

3. The method of forming a forging die block which consists in locating a high speed steel portion within a mold, and pouring powdered austenitic steel into the mold in contact with the sides of the high speed steel portion, and then melting the austenitic steel by the heating effect of an electric current passing therethrough between electrodes, whereby said sides of the high speed steel portion are fused and bonded to the austenitic steel, and then forming a die cavity in the high speed steel portion.

4. The method of forming a forging die block which consists in forming a high speed steel portion with a bevelled end, locating said high speed steel portion within a mold, and pouring powdered austenitic steel into the mold in contact with the sides and bevelled end of the high speed steel portion, and then melting the austenitic steel by the heating effect of an electric current passing therethrough between electrodes, whereby the sides and beveled end of the high speed steel portion are fused and bonded to the austenitic steel, and then forming a die cavity in the high speed steel portion.

5. The method of forming a forging die block which consists in forming a high speed steel annulus, locating said high speed steel annulus within a mold, and pouring powdered austenitic steel into the mold in contact with the interior of the high speed steel annulus, and then melting the austenitic steel by the heating effect of an electric current passing therethrough between electrodes whereby the interior of the high speed steel annulus is fused and bonded to the austenitic steel, and then forming a die cavity in the high speed steel annulus.

6. The method of forming a forging die block which consists in forming a high speed steel portion, locating said high speed steel portion within a mold, and pouring powdered austenitic steel into the mold in contact with the sides and one end of the high speed steel portion, and then melting the austenitic steel by the heating effect of an electric current passing therethrough between electrodes whereby the sides and said one end of the high speed steel portion are fused and bonded to the austenitic steel, and then forming a die cavity in the high speed steel portion.

7. The method of forming a forging die block which consists in locating a high speed steel portion within a mold, and pouring powdered austenitic stainless steel into the mold in contact with certain surfaces of the high speed steel portion, and then melting the austenitic stainless steel by the heating effect of an electric current passing therethrough between electrodes, whereby said certain surfaces of the high speed steel portion are fused and bonded to the austenitic steel, and then forming a die cavity in the high speed steel portion.

CHARLES A. BRAUCHLER.

REFERENCES CITED

The following references are of record in the file of this patent:

UNITED STATES PATENTS

| Number | Name | Date |
| --- | --- | --- |
| 56,885 | Billings | Aug. 7, 1866 |
| 316,489 | Russell | Apr. 28, 1885 |
| 533,182 | Stafford | Jan. 29, 1895 |
| 936,713 | Griffith | Oct. 12, 1909 |
| 1,834,750 | Trembour | Dec. 1, 1931 |
| 2,024,650 | Luce | Dec. 17, 1935 |
| 2,309,288 | Young | Jan. 26, 1943 |
| 2,411,998 | Kelly et al. | Dec. 3, 1946 |
| 2,420,359 | Dasher | May 13, 1947 |